United States Patent [19]

Kakii et al.

[11] Patent Number: 4,682,864
[45] Date of Patent: Jul. 28, 1987

[54] METHOD AND APPARATUS FOR SIMULTANEOUSLY OBSERVING A TRANSPARENT OBJECT FROM TWO DIRECTIONS

[75] Inventors: Toshiaki Kakii; Koichiro Matsuno, both of Kanagawa; Osamu Kawada, Ibaraki; Ryozo Ito; Eiji Nakamura, both of Kanagawa, all of Japan

[73] Assignees: Nippon Telegraph & Telephone Corporation; Nippon Kogaku K.K., both of Tokyo, Japan

[21] Appl. No.: 770,558

[22] Filed: Aug. 29, 1985

[30] Foreign Application Priority Data

Aug. 31, 1984 [JP] Japan .................. 59-180788

[51] Int. Cl.[4] ................................... G02B 21/18
[52] U.S. Cl. ................................................. 350/511
[58] Field of Search ............... 350/511, 512, 513, 514; 356/73.1, 384

[56] References Cited

U.S. PATENT DOCUMENTS 3,218,908 11/1965 Armington .
4,439,010 3/1984 Doty ................................... 350/512

FOREIGN PATENT DOCUMENTS 1772627 10/1971 Fed. Rep. of Germany .
2448651 4/1975 Fed. Rep. of Germany ...... 356/384
2834204 3/1980 Fed. Rep. of Germany ...... 350/511
3216910 11/1983 Fed. Rep. of Germany .

OTHER PUBLICATIONS

Katagiri, et al., Optical Microscope Observation Method of a single-Mode Optical-Fiber Core for Precise Core-Axis Alignment, *Journal of Lightwave Technology*, vol. LT-2, No. 3, Jun. 1984, pp. 277-283.

Primary Examiner—John K. Corbin
Assistant Examiner—Vincent J. Lemmo
Attorney, Agent, or Firm—Cushman, Darby & Cushman

[57] ABSTRACT

In order to simultaneously observe a transparent object from two directions, first and second beam paths containing first and second images from two directions are separated using a prism to reflect the second beam path yet pass the first beam path. The length of the second beam path is caused to be different from that of the first beam path. Then the first and second beam paths are combined so that the first and second images may be viewed simultaneously. The different beam path lengths result in the first and second images being formed at the same position. As a result, the images carried by the first and second beam paths, both passing through a single objective lens, may be viewed simultaneously at a single location.

17 Claims, 4 Drawing Figures

METHOD AND APPARATUS FOR SIMULTANEOUSLY OBSERVING A TRANSPARENT OBJECT FROM TWO DIRECTIONS

BACKGROUND OF THE INVENTION

1. Field of the Invention

This invention relates to devices and methods for simultaneously observing a transparent object from two directions.

2. Description of the Prior Art

Heretofore, a transparent object, such as the junction of the cores or clads of two optical fibers, has been observed from two directions (e.g., horizontal and vertical directions) at the same time by using a microscope. As shown in FIG. 1, a reflector 2 is arranged in the optical path of an illuminating light beam 1 in such a manner that reflector 2 is inclined with respect to the optical path. A microscope 4 is arranged in the direction of light reflected by reflector 2. A transparent object 5 to be observed is positioned at the intersection of illuminating light beam 1 and reflected light beam 3A, so that the objective image and the objective reflection image of object 5 are observed through an objective lens 6.

In observing object 5 in two directions, the length of the optical path of the light beam, which passes through object 5 horizontally (in the X-direction in FIG. 1) and is then reflected by reflector 2 to reach objective lens 6, is different by as much as δ from the length of the optical path of the light beam, which is reflected by reflector 2 and then passes through object 5 vertically (in the Y-direction in FIG. 1) to reach objective lens 6. Accordingly, as shown in FIG. 2, the objective image, in the Y-direction, of object 5 is formed at 5', while the objective image, in the X-direction, of object 5 (namely, an objective reflection image) is formed at 5". The image forming position of the former image is different from that of the latter image as much as the following value:

$$\Delta = \delta \beta_0^2$$

The image forming position difference Δ is approximately as follows: If the object and the reflector provide an optical path difference δ of 200 mμ (δ=200 mμ), objective lenses magnifications $\mu_0$ of 5, 10 and 100 result in image forming position differences Δ of 5 mm, 20 mm and 2 m, respectively. Accordingly, it is difficult to simultaneously observe the two images of the object with a single objective lens 6. Therefore, in the conventional method described above, it is necessary to move the objective lens of the microscope up and down to observe each of the two images clearly.

Thus, the above-described method is disadvantageous in the following points: The simultaneous observation of an object in two directions is considerably low in work efficiency. Furthermore, when it is required to handle the eccentricity or alignment of the axis of an optical fiber by using a TV monitor and a computer, each of the images in the two directions must be processed separately; that is, the required computer operation cannot be achieved in one action.

SUMMARY OF THE INVENTION

This invention eliminates the above-described difficulties accompanying a conventional method of using a microscope to simultaneously observe an object from two directions. More specifically, an object of the invention is to cause the optical paths for the images of the object from the two directions to be different so that the images appear at the same position.

To achieve these objects, the present invention provides a method and apparatus in which a first beam path is generated containing a first image of the object and a second beam path is generated containing a second image of the object. The first and second images are from different directions with respect to the object. Then, the first beam path is separated from the second beam path. After separation, the length of the second beam path is caused to be different from that of the first beam path. Then, the first image associated with the first beam path and the second image associated with the second beam path may be viewed simultaneously. By causing the length of the second beam path to be different from that of the first beam path, the first and second images may be formed at the same position.

This may be accomplished using a single objective lens for both first and second beam paths. The first and second beam paths may be generated using a light source and a reflector positioned so that some light from the source strikes the reflector and then the object for creating the first beam path, while other light from the source strikes the object and then the reflector to form the second beam path. The separation of the first beam path from the second beam path may be accomplished with a prism which reflects the second beam path but transmits the first beam path.

To view the two images simultaneously, means may be provided for combining the first and second images so that they are on opposite halves of the same field of vision. A prism may be used to perform the combining. The altering of the beam path lengths may be accomplished by mirrors.

BRIEF DESCRIPTION OF THE DRAWINGS

These and other objects and advantages of this invention will become more apparent and more readily appreciated from the following detailed description of the presently preferred exemplary embodiments, taken in conjunction with the accompanying drawings, of which.

DETAILED DESCRIPTION OF THE PRESENTLY PREFERRED EXEMPLARY EMBODIMENTS

An apparatus for simultaneously observing a transparent object from two directions according to this invention will be described with reference to FIG. 3, which is an external view of the apparatus, and FIG. 4, which shows the arrangement of an optical system in the apparatus.

Figure 2:
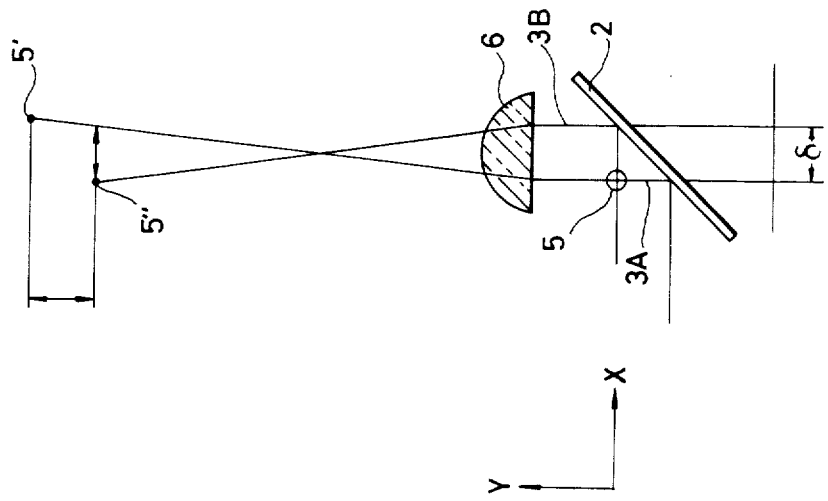
FIG. 2 is a schematic diagram of the optics involved with the arrangement of FIG. 1.
Figure 1:
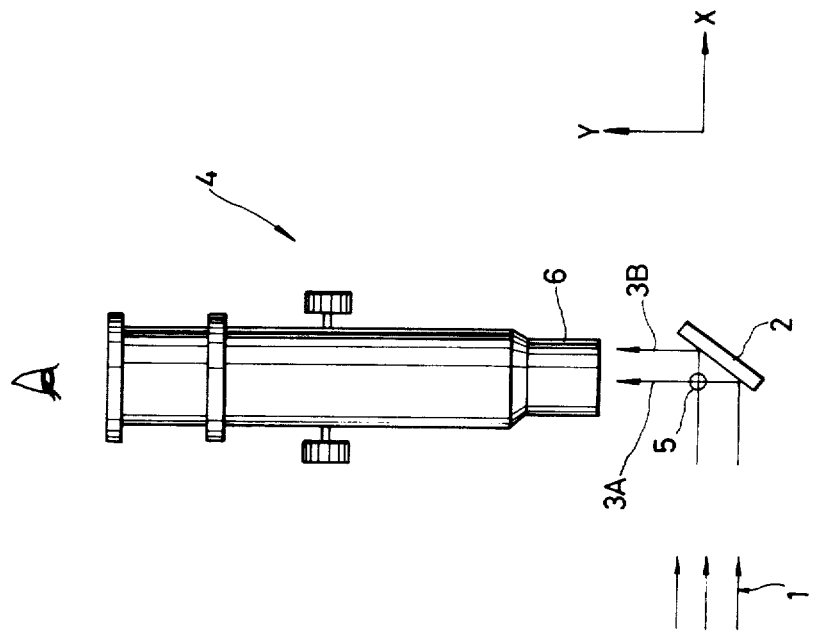
FIG. 1 is a diagram showing a conventional method of using a microscope to observe an object from two directions.
Figure 3:
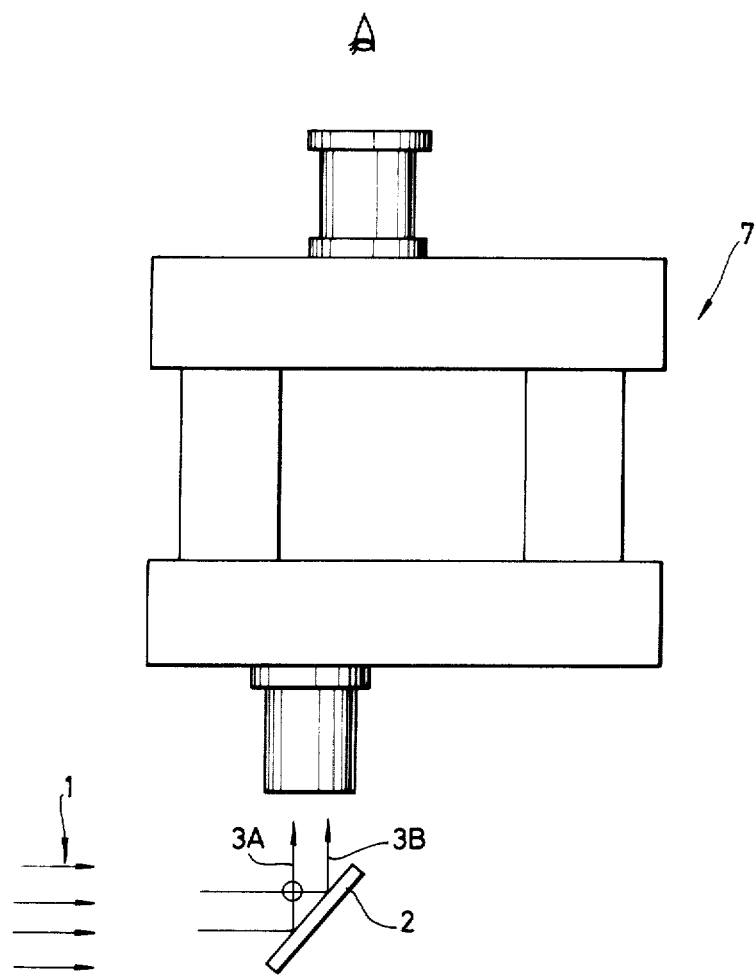
FIG. 3 is an external view showing an apparatus for simultaneously observing a transparent object from two directions according to this invention.

In the optical system of the apparatus as shown in FIG. 3, a reflector 2 is arranged in the incident optical path of illuminating light 1 with its reflecting surface inclined similarly as in the conventional apparatus for simultaneously observing a transparent object from two directions. A microscope 7 is arranged to receive light 3A and 3B reflected by reflector 2 and including the image of the object from two directions.

Figure 4:
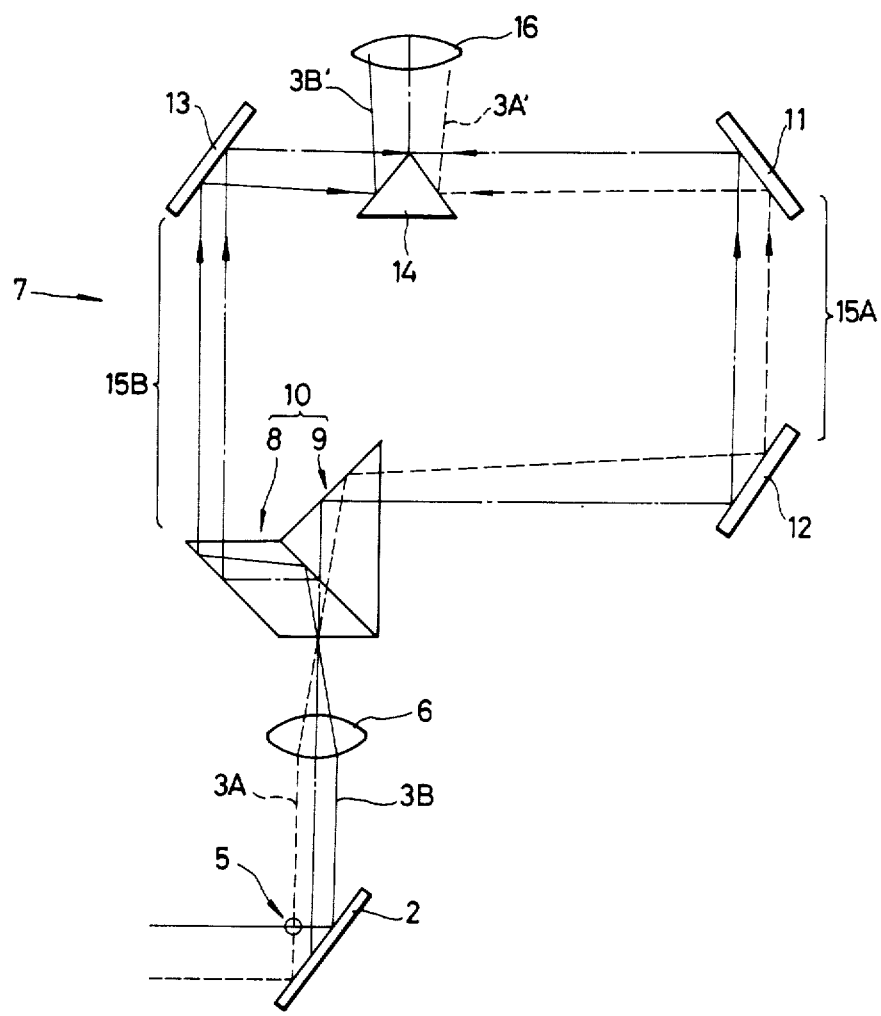
FIG. 4 is a schematic diagram showing the arrangement of optical systems in the apparatus of FIG. 3.

As shown in FIG. 4, an objective lens 6 in microscope 7 provides light to an optical path splitter 10 which creates an objective image forming beam path 3A' and an objective reflection image forming beam path 3B' of transparent object 5. An image forming position difference correcting optical system includes mirrors 11, 12 and 13 arranged in the objective image forming optical path and an objective reflection image forming optical path of the object. The correcting optical system eliminates the difference in image forming position between the objective image and the objective reflection image. A prism 14 is an optical path combining member adapted to combine the objective image forming beam 3A and the objective reflection image forming beam 3B on one side of a single field of vision of an ocular or eyepiece lens 16 (described later). Ocular 16 is arranged to have its front focal point at the image forming position of the objective image forming beam and the objective reflection image forming beam.

Beam splitter 10 is made up of prisms 8 and 9 having the same refractive index which are combined as shown in FIG. 4 and are arranged in the objective image forming optical path and the objective reflection image forming optical path. The image forming beam for the objective image is reflected by the oblique side of the prism 9 so that it is directed towards an image forming position difference correcting optical system 15A. The image forming beam for the objective reflection image is reflected by the oblique sides of the prism 8 so that it is directed towards an image forming position difference correcting optical system 15B.

The objective image and objective reflection image forming position difference correcting optical systems 15A and 15B include mirrors 11, 12 and 13 and prism 14 which are arranged with respect to emergence surfaces of optical path splitter 10 for the objective reflection image forming beam and the objective image forming beam. Mirrors 11, 12 and 13 are positioned in such a manner that the reflection surface of each mirror forms an angle of 45° with the direction of the optical beam. The objective reflection image forming beam and the objective image forming beam reflected by mirrors 11, 12 and 13 and prism 8 are simultaneously applied to the field of vision of eyepiece lens 16 through prism 14 adapted to join the halves of the field of vision together.

Those of ordinary skill in the art, studying FIG. 4, will readily appreciate that prism 14 causes the first and second images from mirrors 11 and 13 to be positioned when presented to lens 16 so that the first and second images are adjacent to each other and do not overlap.

Mirrors 11 and 12 are positioned so that the image forming beam path between beam splitter 10 and prism 14 on the side of the objective image is made longer than the image forming beam path between beam splitter 10 and prism 14 on the side of the objective reflection image so as to eliminate the difference in positions at which the images form between the objective image forming beam and the objective reflection image forming beam. The image forming positions of the objective image and the objective reflection image are located before the front focal point of eyepiece lens 16.

In the above-described embodiment, the image forming position difference correcting optical system 15A and 15B are so designed that the mirrors 11, 12 and 13 are employed to make different the lengths of the objective image optical path and the objective reflection image optical path between beam splitter 10 and prism 14. However, the apparatus may be so modified that a material having a refractive index n and a thickness d is inserted in the objective image forming beam path so that the latter may be shortened. Furthermore, combinations of other optical parts can be employed as long as they can eliminate the difference in length between the two image forming optical paths.

In the above-described embodiment, only one eyepiece lens 16 is employed. However, in order to observe the objective image and the objective reflection image separately, but with the image forming position difference eliminated, the apparatus may be so designed that it uses two eyepiece lenses.

When the apparatus thus constructed according to the invention is used to observe an object from two directions, for instance the junction of an optical fiber, an illuminating beam is applied to the optical fiber in one direction. Then, the lens barrel of the microscope 7 is moved up and down so that it is focused on fiber 5, i.e., the image of fiber 5 is formed. Under this condition, reflector 2 is moved back and forth in the direction of illumination of the illuminating beam to adjust the distance $\delta$ between reflector 2 and optical fiber 5 until the objective reflection image can be clearly observed.

Microscope 7 has an optical system which, with respect to an object having a set optical path difference $\delta$, performs correction to eliminate the image forming position difference. Therefore when reflector 2 is positioned at the distance $\delta$ from optical fiber 5, the focal point with respect to beam 3A' coincides with the focal point with respect to beam 3B'.

By performing the above-described adjustments, the two-direction images of the optical fiber can be observed through eyepiece lens 16. If, instead of eyepiece lens 16, an image sensor, such as a pickup tube, is mounted so that images are displayed on a TV monitor, then the observation can be achieved more readily because contrast can be readily given to the images.

As is apparent from the above description, the method and apparatus of the invention permit the simultaneous two-direction observation of an object which heretofore could not be achieved. For instance, the eccentricity or alignment of the axis of an optical fiber and the junction thereof can be observed with high efficiency according to the invention.

In examining eccentricity or alignment of the axis of an optical fiber with a TV monitor and a computer, the conventional method must process two images (in two directions) separately; however, with the apparatus of the invention, the two-direction images of a transparent object can be observed simultaneously, i.e., the same results can be obtained by processing only one image. Thus, according to the invention, the efficiency of image processing can be remarkably improved.

Although only a single embodiment has been described in detail above, those skilled in the art will readily appreciate that many modifications are possible in the preferred embodiment without materially departing from the novel teachings and advantages of this invention. Accordingly, all such modifications are intended to be included within the scope of the following claims.

What is claimed is:

1. Apparatus for observing a transparent object from two directions comprising:

an objective lens;

reflection means positioned opposite said objective lens with respect to said transparent object, said objective lens being adapted to allow first and second image paths to pass therethrough, said first image path containing a direct image provided by directly passing light through said transparent object in one direction, said second image path containing a reflected image provided by passing light through said transparent object in another direction to form a reflected image on said reflection means, said reflected image being directed to said objective lens;

means for separating said first and second image paths from each other;

means for combining the said first and second image paths so that said direct image and said reflected image are at the same image forming position adjacent to each other; and means for viewing said images.

2. Apparatus as claimed in claim 1, wherein said viewing means comprises a single ocular lens.

3. Apparatus as claimed in claim 1, further comprising:

means, optically disposed between said separating means and said aligning means, for correcting an optical path length difference between said first and second image paths from said transparent object to said objective lens.

4. Apparatus for observing a transparent object from two directions comprising:

means for generating a first beam path containing a first image of said object and a second beam path containing a second image of said object, said first image and said second image being from different directions with respect to said object;

means for separating said first beam path from said second beam path;

means for simultaneously viewing said first image and said second image; and means for causing the length of said first beam path to be different from that of said second beam path and for causing said first and second images to be formed at the same position adjacent to each other.

5. Apparatus as in claim 4 wherein said generating means comprises:

a light source; and a reflector disposed with respect to said object and said light source to reflect light from said source so that said light passes through said object in a first direction to form said first beam path and to reflect light from said source having already passed through said object to form said second beam path.

6. Apparatus as in claim 4 wherein said separating means includes a first prism disposed to reflect said first beam path and transmit said second beam path.

7. Apparatus as in claim 6 wherein said separating means further includes a second prism disposed adjacent said first prism, said second beam path being reflected by two surfaces of said first prism before said second beam path exits said first prism and said first beam path being transmitted through said first prism and being reflected by one surface of said second prism before said first beam path exits said second prism.

8. Apparatus as in claim 4 wherein said simultaneous viewing means incldues means for combining said first and second beam paths so that said first and second images appear in opposite halves of a single field of vision.

9. Apparatus as in claim 8 wherein said combining means includes a third prism having first and second faces for reflecting said first and second beam paths, respectively, to cause said first and second beam paths to be parallel and adjacent to each other.

10. Apparatus as in claim 9 wherein said simultaneous viewing means further comprises an eyepiece for receiving said first and second beam paths from said third prism and forming said first and second images.

11. Apparatus as in claim 4 wherein said causing means includes first and second mirrors for reflecting said first beam path, the position of said first and second mirrors causing said first beam path to have a different length than said second beam path.

12. Apparatus as in claim 4 further comprising an objective lens, said first and second beam paths passing through said objective lens before being applied to said separating means.

13. Apparatus for observing a transparent object from two directions comprising:

a light source for illuminating said object;

reflecting means for reflecting light from said source so that said light passes through said object in a first direction to form a first beam path containing a first image of said object and for reflecting light from said source having already passed through said object in a second direction to form a second beam path containing a second image of said object;

a single objective lens, said first and second beam paths passing through said single objective lens;

a first prism for reflecting said second beam path and transmitting said first beam path to cause said first and second beam paths to be separated;

means for combining said first and second beam paths so that said first and second images form adjacent halves of a single field of vision; and means, optically disposed between said prism and said combining means, for causing the length of said second beam path to be different from that of said first beam path to cause said first and second images to be formed at the same position.

14. Apparatus as in claim 13 further comprising a second prism disposed adjacent said first prism, said second beam path being reflected by two surfaces of said first prism before said first beam path exits said first prism, said first beam path being transmitted through said first prism and being reflected by one surface of said second prism before said first beam path exits said second prism.

15. Apparatus as in claim 13 wherein said combining means includes a third prism having first and second faces for reflecting said first and second beam paths, respectively, so that said beam paths are parallel and adjacent to each other.

16. Apparatus as in claim 15 further comprising an eyepiece for forming said first and second images from said parallel first and second beam paths.

17. Apparatus as in claim 13 wherein said causing means includes first and second mirrors optically disposed between said prism and said combining means, the positions of said first and second mirrors causing the length of said first beam path to be different than said second beam path.

* * * * *

UNITED STATES PATENT AND TRADEMARK OFFICE
CERTIFICATE OF CORRECTION

PATENT NO. : 4,682,864

DATED : Jul. 28, 1987

INVENTOR(S) : Toshiaki KAKII, Koichiro MATSUNO, Osamu KAWADA, Ryozo ITO, Eiji NAKAMURA It is certified that error appears in the above-identified patent and that said Letters Patent is hereby corrected as shown below:

ON THE FIRST INFORMATION PAGE:

Please change

"[73] Assignees: Nippon Telegraph & Telephone Corporation, Nippon Kogaku K.K., both of Tokyo, Japan" to --[73] Assignees: Sumitomo Electric Industries, Ltd., Osaka, Japan; Nippon Telegraph & Telephone Corporation; Nippon Kogaku K.K., both of Tokyo, Japan--.

Signed and Sealed this

Twenty-first Day of June, 1988

Attest:

DONALD J. QUIGG

Attesting Officer

Commissioner of Patents and Trademarks